United States Patent [19]
Kaczur et al.

[11] Patent Number: 5,264,089

[45] Date of Patent: * Nov. 23, 1993

[54] PRODUCTION OF CHLORINE DIOXIDE EMPLOYING CHLORIC ACID - ALKALI METAL CHLORATE MIXTURES

[75] Inventors: Jerry J. Kaczur; David W. Cawlfield, both of Cleveland, Tenn.

[73] Assignee: Olin Corporation, Cheshire, Conn.

[*] Notice: The portion of the term of this patent subsequent to Jan. 28, 2009 has been disclaimed.

[21] Appl. No.: 919,697

[22] Filed: Jul. 24, 1992

Related U.S. Application Data

[60] Continuation-in-part of Ser. No. 765,078, Sep. 24, 1991, which is a division of Ser. No. 475,603, Feb. 6, 1990, Pat. No. 5,084,148.

[51] Int. Cl.$^5$ .............................................. C25B 1/26
[52] U.S. Cl. ........................................ 204/95; 204/98; 204/101; 204/103; 423/475; 423/477
[58] Field of Search ................... 204/95, 98, 101, 103; 423/475, 477

[56] References Cited

U.S. PATENT DOCUMENTS

| | | | |
|---|---|---|---|
| 3,810,969 | 5/1974 | Schlumberger | 423/478 |
| 4,486,399 | 12/1984 | Lobley | 423/478 |
| 4,683,039 | 7/1987 | Twardowski et al. | 204/95 |
| 4,798,715 | 1/1989 | Hardee et al. | 423/478 |
| 4,915,927 | 4/1990 | Lipsztajn et al. | 423/472 |
| 5,084,148 | 1/1992 | Kazcur et al. | 204/95 |

Primary Examiner—John Niebling
Assistant Examiner—Patrick J. Igoe
Attorney, Agent, or Firm—James B. Haglind; F. A. Iskander

[57] ABSTRACT

A continuous process for producing chlorine dioxide which comprises feeding an aqueous solution of an alkali metal chlorate to a first ion exchange compartment of an electrolytic cell having an anode compartment, a cathode compartment and at least one ion exchange compartment between the anode compartment and the cathode compartment, electrolyzing an anolyte in the anode compartment to generate hydrogen ions, passing the hydrogen ions from the anode compartment through a cation exchange membrane into the first ion exchange compartment to displace alkali metal ions and produce an aqueous solution of chloric acid and alkali metal chlorate, passing alkali metal ions from the first ion exchange compartment into the cathode compartment, and reacting in a chlorine dioxide generator the aqueous solution of chloric acid and alkali metal chlorate substantially free of anionic and cationic impurities with a reducing agent which does not form persistent anions in the generator solution, to generate chlorine dioxide and to form an alkali metal chlorate precipitate. The alkali metal chlorate precipitate is recycled by dissolving the precipitate into the alkali metal chlorate feed stream that is fed to the first ion exchange compartment of the electrolytic cell.

27 Claims, 3 Drawing Sheets

PRODUCTION OF CHLORINE DIOXIDE EMPLOYING CHLORIC ACID - ALKALI METAL CHLORATE MIXTURES

This is a Continuation-in-Part Application of U.S. Ser. No. 07/765,078, filed Sep. 24, 1991, which is a division of Application Ser/ No. 07/475,603, filed Feb. 6, 1990, now U.S. Pat. No. 5,084,148 issued Jan. 28, 1992.

FIELD OF THE INVENTION

This invention relates to a process for producing chlorine dioxide from electrochemically produced chloric acid-alkali metal chlorate solutions.

BACKGROUND OF THE INVENTION

Chlorine dioxide has found wide use as a disinfectant in water treatment/purification, as a bleaching agent in pulp and paper production, and a number of other uses due to its high oxidizing power. There is a variety of chlorine dioxide generator systems and processes available in the marketplace. Most of the very large scale generators employed, for example, in pulp and paper production, utilize an alkali metal chlorate salt, a reducing agent, and an acid in a chemical process for producing chlorine dioxide. These generators and the processes employed also produce by-product salts such as sodium chloride, sodium sulfate, sodium sesquisulfate or sodium bisulfate. In pulp and paper mills, the typical by-product is sodium sulfate (saltcake) which is converted into a sulfur salt of sodium in a high temperature boiler and used in the paper process. Boilers require energy and the paper mills have a limited boiler capacity. Increasing the production of chlorine dioxide generally means increased capital investment to provide the added boiler capacity required to process the added amounts of saltcake by-product produced.

Thus a process which reduces the amount of a by-product salt, such as sodium chloride or sodium sulfate, produced while efficiently generating chlorine dioxide is commercially desirable.

U.S. Pat. No. 3,810,969 issued May 14, 1974 to A. A. Schlumberger teaches a process for producing chloric acid by passing an aqueous solution containing from 0.2 gram mole to 11 gram moles per liter of an alkali metal chlorate such as sodium chlorate through a selected cationic exchange resin at a temperature from 5° to 40° C. The process produces an aqueous solution containing from 0.2 gram mole to about 4.0 gram moles of $HClO_3$. This process requires the regeneration of the cationic exchange resin with acid to remove the alkali metal ions and the treatment or disposal of the acidic salt solution.

K. L. Hardee et al, in U.S. Pat. No. 4,798,715 issued Jan. 17, 1989, describe a process for chlorine dioxide which electrolyzes a chloric acid solution produced by passing an aqueous solution of an alkali metal chlorate through an ion exchange resin. The electrolyzed solution contains a mixture of chlorine dioxide and chloric acid which is fed to an extractor in which the chlorine dioxide is stripped off. The ion exchange resin is regenerated with hydrochloric acid and an acidic solution of an alkali metal chloride is formed.

In U.S. Pat. No. 4,683,039, Twardowski et al describe a method for producing chlorine dioxide in which the chlorine dioxide is produced in a generator by the reaction of sodium chlorate and hydrochloric acid. After separating chlorine dioxide gas the remaining sodium chloride solution is fed to a three-compartment cell to form sodium hydroxide and an acidified liquor which is returned to the chlorine dioxide generator.

Each of the above processes produces a fixed amount and type of by-product salt.

M. Lipsztajn et al, teach an electrolytic-dialytic process for producing chloric acid and sodium hydroxide from sodium chlorate. Chlorate ions are transferred through an anion-exchange membrane and sodium ions are passed through a cation-exchange membrane (U.S. Pat. No. 4,915,927, Apr.10, 1990).

M. Lipsztajn et al, in PCT Application No. WO 92/03374, published Mar. 5, 1992, teach an electrochemical process for producing chlorine dioxide comprising the reduction of chloric acid in an aqueous reaction medium in a reaction zone at a total acid normality of up to about 7 normal and in the substantial absence of sulfate ion and in the presence of a dead load of alkali metal chlorate added to and subsequently removed from the reaction medium. The dead load of alkali metal chlorate cycles between a reaction zone and an electrolysis zone. In the process, the electroysis zone comprises an electrolytic cell comprising a cation-exchange membrane dividing the cell into an anode compartment and a cathode compartment, feeding a chloric acid solution with a dead load of alkali metal chlorate into the anode compartment, electrolytically producing hydrogen ions in the anode compartment while simultaneously effecting transfer of alkali metal cations from said anode compartment through said cation-exchange membrane to said cathode compartment, and removing an acidified feed solution from said anode compartment.

Applicants have found when operating similar processes where acidic solutions containing chlorate ions are electrolyzed in an anode compartment, that in addition to the oxidation of water to produce oxygen and hydrogen ions, chlorate ions are also oxidized at the anode forming perchlorate ions. These perchlorate ions as perchloric acid in the acidic solutions in a chlorine dioxide generator also can react with added reducing agents, but does not form chlorine dioxide. This formation of perchlorate ion creates an inefficiency, resulting in the added consumption of valuable chlorate and reducing agent and thereby increases the cost of producing chlorine dioxide.

BRIEF SUMMARY OF THE INVENTION

Now a process has been discovered which permits variability in the composition of an alkali metal chlorate solution used in chlorine dioxide generators. It has been found that a solution of chloric acid and alkali metal chlorate substantially free of of anionic and cationic impurities is particularly useful in these generators. Further, the process permits a substantial reduction in the amount of undesirable by-products produced by the chlorine dioxide generator system. Still further, the process allows for the production of an alkali metal hydroxide as a valuable by-product or acidic solutions of alkali metal salts at reduced energy costs. In addition, the process results in the reduction of process steps and process equipment required for the production of chlorine dioxide. Still further, the process permits a reduction in the amount of alkali metal chlorate and reducing agent required to produce chlorine dioxide by avoiding the formation of perchlorate ions.

The preferred embodiment of the present invention is a continuous process for chlorine dioxide production. The first part of this continuous process is accomplished in a process for electrolytically producing an aqueous solution of chloric acid - alkali metal chlorate in an electrolytic cell having an anode compartment, a cathode compartment, and at least one ion exchange compartment between the anode compartment and the cathode compartment, characterized by feeding an aqueous solution of an alkali metal chlorate to the ion exchange compartment, electrolyzing an anolyte in the anode compartment to generate hydrogen ions, passing the hydrogen ions from the anode compartment through a cation exchange membrane into the ion exchange compartment to displace alkali metal ions and produce an aqueous solution of chloric acid and alkali metal chlorate, passing alkali metal ions from the ion exchange compartment into the cathode compartment, and removing the aqueous solution of chloric acid and alkali metal chlorate from the ion exchange compartment. Thus, the aqueous solution of chloric acid - alkali metal chlorate is now substantially free of anionic and cationic impurities.

The next step of the preferred embodiment of the continuous process for chlorine dioxide production of the invention is feeding the aqueous solution of chloric acid - alkali metal chlorate substantially free of anionic and cationic impurities produced by an electrolytic process to a chlorine dioxide generator where it is reacted with a reducing agent which does not form persistent anions in the aqueous solution of the generator. In this generator, the chloric acid is reduced to form chlorine dioxide and an alkali metal chlorate is precipitated. The precipitated alkali metal chlorate is recycled to the ion exchange compartment of the electrolytic cell via the alkali metal chlorate feed stream.

The alkali metal chlorate feed stream contains the precipitated alkali metal chlorate and make-up alkali metal chlorate added to replace the chlorate consumed in the chlorine dioxide generation process.

BRIEF DESCRIPTION OF THE DRAWINGS

More in detail, the novel process of the present invention and its application in producing chlorine dioxide can be carried out in the apparatus illustrated in the following figures.

DETAILED DESCRIPTION OF THE DRAWINGS

Figure 1:
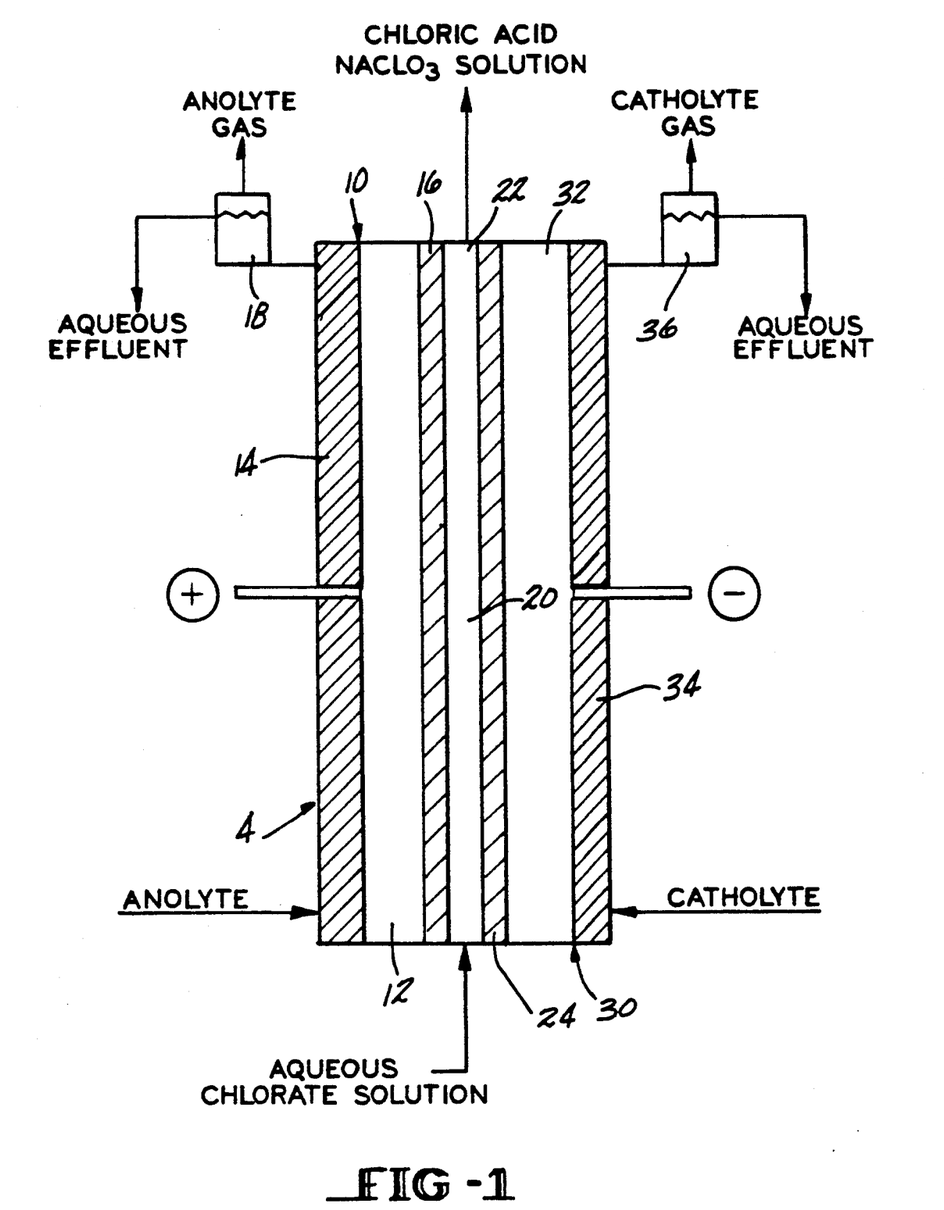
FIG. 1 is a sectional side elevational view of an electrolytic cell which can be employed in the novel process of the present invention.

FIG. 1 shows an electrolytic cell 4 divided into anode compartment 10, ion exchange compartment 20, and cathode compartment 30 by cation permeable ion exchange membranes 16 and 24. Anode compartment 10 includes anode 12, and anode spacer 14. Anode spacer 14 positions porous anode 12 with respect to cation permeable ion exchange membrane 16 and aids in the disengagement of anolyte gas produced. Anolyte disengager 18 completes the disengagement of anolyte gas from the spent anolyte solution. Ion exchange compartment 20 includes spacer material 22 which provides a flow channel between cation permeable ion exchange membranes 16 and 24 for the aqueous alkali metal chlorate solution. Cathode compartment 30 includes cathode 32, and cathode spacer 34. Cathode spacer 34 positions cathode 32 with respect to cation permeable ion exchange membrane 24 and aids in the disengagement of catholyte gas produced. The disengagement of catholyte gas from the spent catholyte solution is accomplished in cathode disengager 36.

Figure 2:
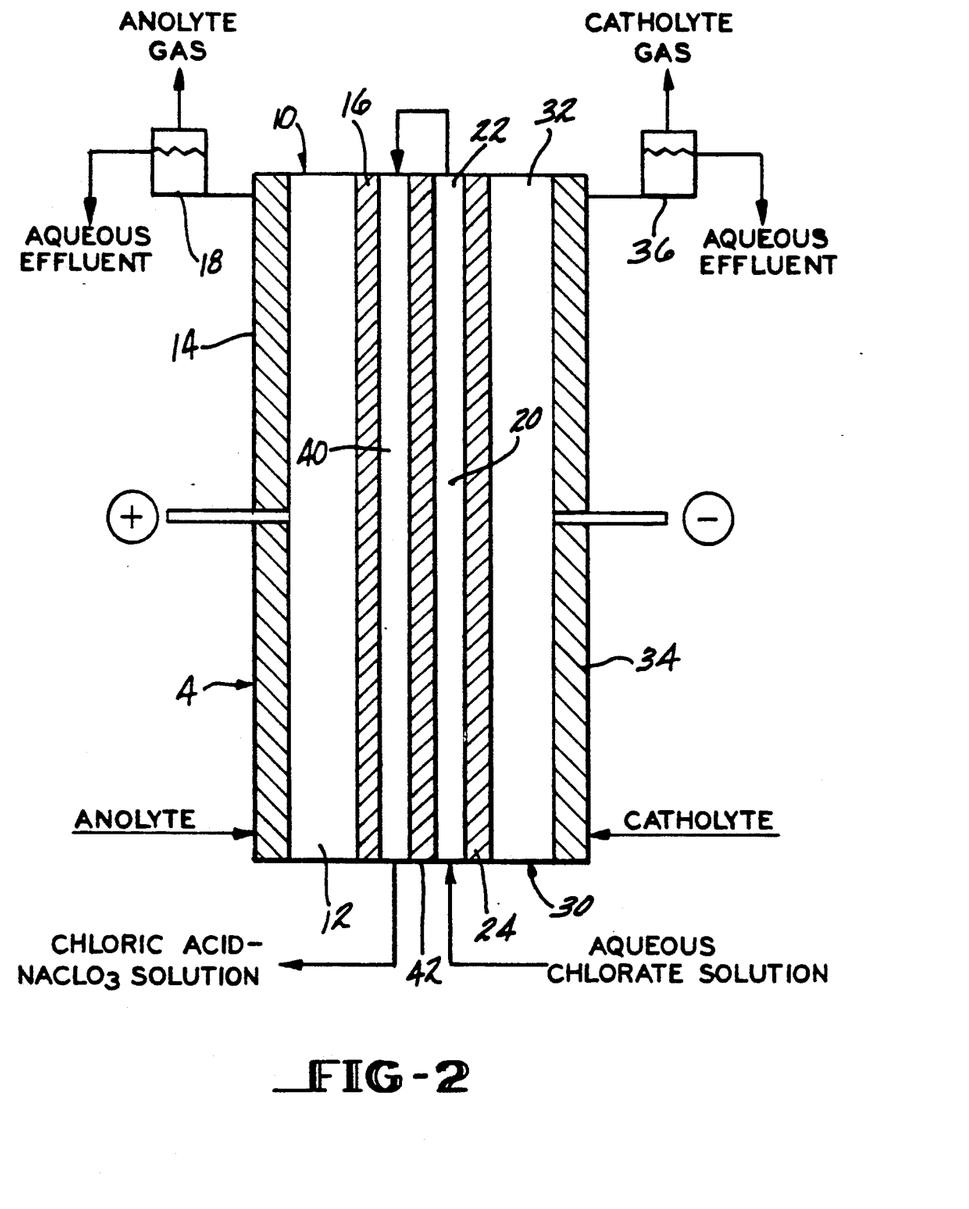
FIG. 2 is a sectional side elevational view of an additional electrolytic cell which can be employed in the process of the present invention.

In FIG. 2, electrolytic cell 4 has been expanded to include a second ion exchange compartment 40 which is positioned between anode compartment 10 and ion exchange compartment 20. Cation permeable ion exchange membrane 16 separates anode compartment 10 from ion exchange compartment 40. The sodium chlorate feed solution enters the lower part of ion exchange compartment 20, flows upward and out of ion exchange compartment 20 into the upper part of ion exchange compartment 40. The $HClO_3$3/$NaClO_3$ product solution is recovered from the lower part of ion exchange compartment 40.

The flow direction in the ion exchange compartments can also be reversed, for example, with the solution from the top of ion exchange compartment 20 being fed to the bottom of ion exchange compartment 40. The product solution then exits from the top of ion exchange compartment 40.

Figure 3:
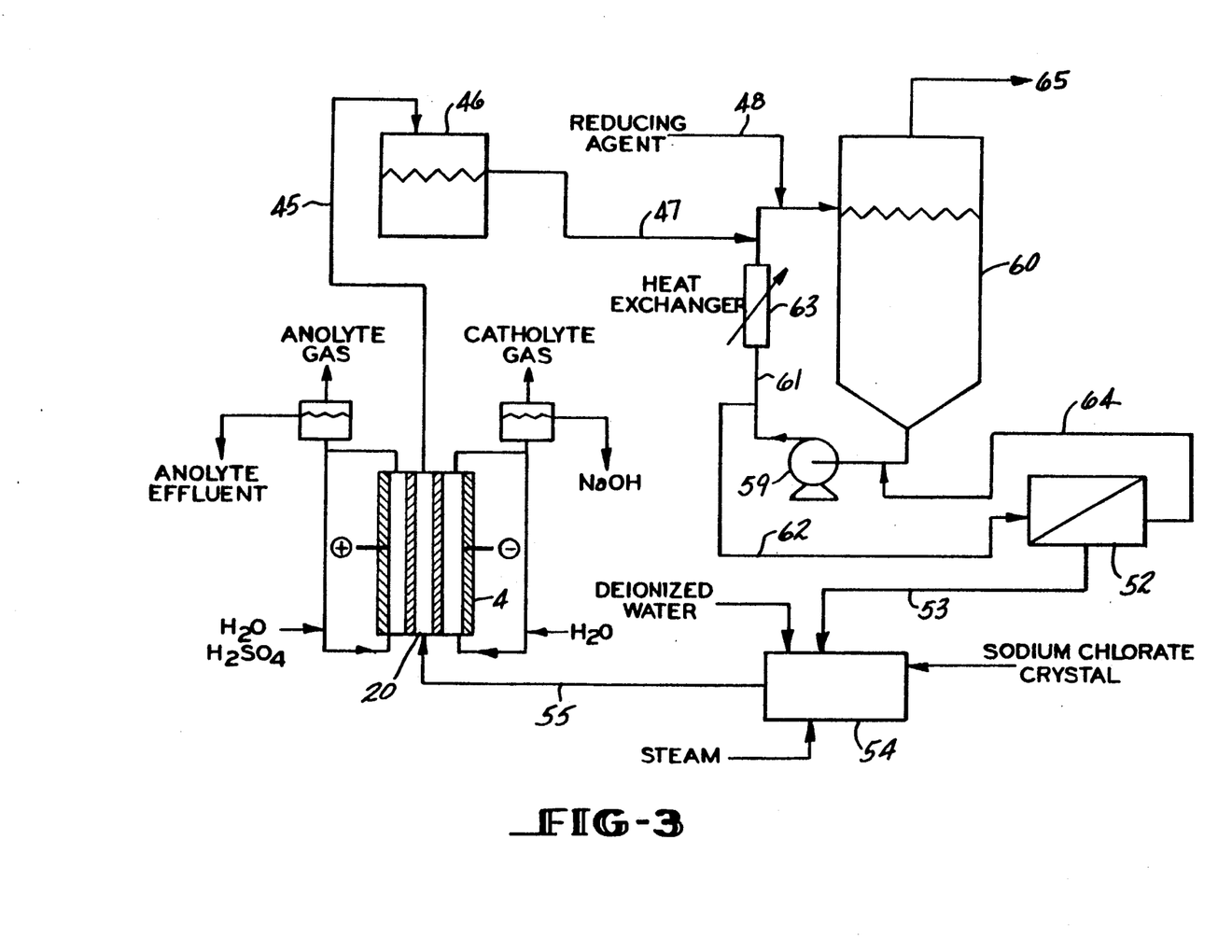
FIG. 3 is a diagrammatic illustration of a system which can be employed in the process of the present invention.

In the continuous process depicted in FIG. 3, the chloric acid - alkali metal solution from ion exchange compartment 20 of electrolytic cell 4 is fed to solution surge or storage tank 46 by line 45. The use of the surge tank 46 is preferred, but not required for process operation. The surge tank isolates electrolytic cell 4 from liquid column and subatmospheric or superatmospheric process pressures used to operate chlorine dioxide generator 60. The chloric acid - alkali metal chlorate solution from surge tank 46 then enters into the chlorine dioxide generator 60 aqueous solution circulation recycle loop through line 47.

The chlorine dioxide generator system consists of chlorine dioxide generator vessel 60 with circulation pump 59 pumping a slurry of aqueous chloric acid - alkali metal chlorate and precipitated alkali metal chlorate containing small amounts of residual reducing agent and its reaction byproducts around the flow loop. The pump output flows through line 61 into a heat exchanger 63 and back into generator 60. Heat exchanger 63 supplies the heat requirement for the removal of water vapor by evaporation that exits with the chlorine dioxide product from generator 60 through line 65. Reducing agent is added through line 48 into chlorine dioxide generator 60. The chlorine dioxide product, water vapor and reducing agent byproduct gases exit from generator 60 by line 65 preferably under subatmospheric pressure.

A portion of the generator slurry flow from pump 59 is routed to separator 52 by line 62 to separate the alkali metal precipitate from the aqueous chloric acid - alkali metal chlorate solution phase. There are a number of suitable types of separators that can be employed such as centrifuges, belt filters, etc. The aqueous phase solution from separator 52 is then recycled back into generator 60 circulation loop by line 64.

The separated alkali metal precipitate from separator 52, which can be in the form of small crystals, or more preferably large crystals, can be washed with deionized water or more preferably with a concentrated alkali metal chlorate solution, such as a portion of the electrolytic cell alkali metal chlorate aqueous feed, to reduce the amount of chloric acid ultimately recycled to the ion exchange compartment of electrolytic cell 4. The rinse wash liquor containing the residual chloric acid is preferably recycled back into generator 60 and is not shown. The recycle concentration of chloric acid in the alkali metal feed to the first ion exchange compartment of electrolytic cell 4 is preferably less than about 2 normal, and more preferably less than 1 normal, and most preferably less than 0.5 normal. High concentrations of residual chloric acid in the feed to the electrolytic cell will lower the electrolytic cell current efficiency in terms of alkali metal ion removal efficiency in direct proportion with the chloric acid strength.

The preferably washed alkali metal precipitate then enters alkali metal chlorate feed dissolving tank 54 by line 53. Dissolving tank 54 has a crystal alkali metal chlorate, such as commercial grade sodium chlorate crystal, addition point as well as a deionized water feed point for solution preparation and steam or other heating source to prepare a concentrated alkali metal chlorate solution. The dissolving tank also includes means for mixing and agitating as well as for filtering the solution, making it suitable as a feed into a first ion exchange compartment 20 of electrolytic cell 4 by line 55.

Electrolytic cell 4 shows a recirculating anolyte stream having water and sulfuric acid addition as required. Anolyte effluent can be recovered from the gas disengager from excess solution volume additions to the anolyte. Anolyte gas is from the gas disengager. The catholyte stream of electrolytic cell 4 also shows one embodiment with a recirculating catholyte, such as NaOH with water addition to dilute the alkali metal hydroxide produced. The catholyte gas is separated in the gas disengager.

DETAILED DESCRIPTION OF THE INVENTION

The continuous chlorine dioxide process of the invention consists of electrolytically preparing an aqueous solution of chloric acid - alkali metal chlorate substantially free of anionic and cationic impurities which is reacted with a reducing agent which does not form persistent anions in the aqueous reaction medium in the chlorine dioxide generator and forms chlorine dioxide and an alkali metal chlorate precipitate. The alkali metal chlorate precipitate is separated from the aqueous reaction mixture, and washed to reduce the amount of residual chloric acid in the precipitate, and recycled to a first ion exchange compartment of the electrolytic cell in the alkali metal chlorate feed stream. The generator aqueous reaction liquor separated from the alkali metal chlorate precipitate is recycled to the chlorine dioxide generator. The washed alkali metal chlorate precipitate is introduced into the alkali metal chlorate feed dissolving system. Make-up additional alkali metal chlorate is added to the alkali metal chlorate feed system to replace alkali metal chlorate consumed in the process of chlorine dioxide generation. The alkali metal chlorate feed stream comprising recycled alkali metal chlorate and make-up alkali metal chlorate is fed to the first ion exchange compartment of an electrolytic cell having at least one ion exchange compartment. In the continuous production of chlorine dioxide, an aqueous solution of chloric acid - alkali metal chlorate substantially free of anionic and cationic impurities is the preferred reaction component in the production of chlorine dioxide with a reducing agent that does not form persistent anions.

Applicants, aqueous solution chloric acid and alkali metal chlorate, being substantially free of anionic and cationic impurities means that it does not contain significant amounts of sulfate, chloride, hypochlorite, phosphate, or perchlorate ions, these being anionic impurities. For example, the sulfate content should be less than about 1 wt %, and the perchlorate content should be less than about 1 wt %. When chloride ion is present, chlorine dioxide may be spontaneously formed in the electrolytic cell, where applicants have found that it migrates through the membrane into the cathode compartment. In the cathode compartment, chlorine dioxide is reduced to form undesired chlorite ions impurities in the alkali metal hydroxide product. For this reason, chloride ion content of the chlorate feed is preferred to be less than about 1 wt % and preferably less than about 0.1 wt %, and thus the aqueous solution of chloric acid and alkali metal chlorate also contains less than about 1.0 wt % and preferably less than about 0.1 wt % of chloride ion. Cationic impurites to be avoided include transition metal ions, such as those of iron, nickel, chromium and vanadium. These may decompose chlorine dioxide when present at concentrations of about 1 wt % or greater.

The chloric acid - alkali metal chlorate solution is produced in the process electrolytic cell as follows.

An aqueous solution of an alkali metal chlorate is fed to the single or multiple ion exchange compartments of the electrolytic cell. Suitable alkali metal chlorates include sodium chlorate, potassium chlorate and lithium chlorate. In order to simplify the disclosure, the process of the invention will be described using sodium chlorate, which is a preferred embodiment of the alkali metal chlorates. As shown in FIG. 3, the alkali metal chlorate feed solution may be prepared, for example, by dissolving a crystalline alkali metal chlorate, such as sodium chlorate, in pure or deionized water. Commercial sodium chlorate is suitable as it has a low sodium chloride content and the formation of undesirable amounts of chlorine dioxide in the electrolytic cell is prevented.

Aqueous alkali metal chlorate feed solutions which may be employed contain any suitable concentrations of alkali metal chlorate (eg., sodium chlorate) up to about saturation at the temperatures at which the solutions are fed to the ion exchange compartment. For purposes of illustration, sodium chlorate will be used as an example of an alkali metal chlorate. Sodium chlorate solutions having a concentration in the range of from about 0.1% by weight to those saturated with sodium chlorate at temperatures in the range from about 0° C. to about 100° C., and preferably from about 15° C. to about 80° C. Sodium chlorate solutions having a concentration in the range from about 0.1% by weight to about 60% by weight of NaClO$_3$, preferably from about 20% to about 55%, and more preferably from about 30% to about 50% by weight of NaClO$_3$ are also suitable.

The process of the invention utilizes an electrochemical cell to generate hydrogen ions that displace or replace a portion of the sodium ions present in the aqueous sodium chlorate solution feed stream.

The generation of hydrogen ions in the process of the present invention in the anode compartment is accompanied, for example, by the oxidation of water on the anode into oxygen gas and H+ions by the electrode reaction as follows:

$$2H_2O \rightarrow O_2 + 4H^+ + 4e^-$$

The anode compartment contains an anolyte, which can be an aqueous solution of any non-oxidizable acid electrolyte which is suitable for conducting hydrogen ions into the ion exchange compartment. Non-oxidizable acids which may be used include sulfuric acid, phosphoric acid, perchloric acid and the like. Where a non-oxidizable acid solution is used as the anolyte, the concentration of the anolyte is preferably selected to match the osmotic concentration characteristics of the alkali metal chlorate solution fed to the ion exchange compartment to minimize water exchange between the anode compartment and the ion exchange compartment. Additionally, a solution of hydrochloric acid or a mixture of HCl and an alkali metal choride can be used as the anolyte, which results in a generation of chlorine gas at the anode. Where a chlorine generating anolyte is employed, it is necessary to select a cation exchange membrane as the separator between the anode compartment and the ion exchange compartment which is stable to chlorine gas. The anode compartment may also employ as the anolyte electrolyte a strong acid cation exchange resin in the hydrogen form and an aqueous solution such as deionized water.

Any suitable anode may be employed in the anode compartment, including those which are available commercially as dimensionally stable anodes. Preferably, an anode is selected which will generate oxygen gas.

These anodes include porous or high surface area anodes. As materials of construction for the anodes, metals including platinum, gold, palladium, or mixtures or alloys thereof, or thin coatings of such materials on various substrates such as valve metals, i.e., titanium, can be also be employed. Additionally oxides of iridium, rhodium or ruthenium, and alloys and their mixtures with other platinum group or precious metals could also be employed. Commercially available oxygen evolution anodes of this type include those manufactured by Englehard (PMCA 1500) or Eltech (TIR-2000). Other suitable anode materials include graphite, graphite felt, a multiple layered graphite cloth, a graphite cloth weave, carbon, etc.

The hydrogen ions generated in the anode compartment pass through the cation exchange membrane into the sodium chlorate solution in the ion exchange compartment. As a hydrogen ion enters the solution, a sodium ion is displaced and by electrical ion mass action passes through the cation membrane adjacent to the cathode compartment to maintain electrical neutrality.

The electrolytic process of the invention as operated results in the conversion of sodium chlorate to chloric acid over a wide range, for example, from about 1% to about 99.9%, preferably from about 5% to about 95%, and more preferably from about 15% to about 90%.

The sodium chlorate feed solution concentration, the residence time in the ion exchange compartment as well as the cell amperage are factors that affect the extent of the conversion of sodium chlorate to chloric acid.

Using very dilute solutions of sodium chlorate, high percentages of conversion of $NaClO_3$ to chloric acid can be achieved, i.e., up to 99.9%. For a single pass flow through system, typical residence times in the ion exchange compartment are between about 0.1 to about 120 minutes, with a more preferred range of about 0.5 to about 60 minutes.

The electrolytic part of the present invention is operated at a current density of from about 0.01 $KA/m^2$ to about 10 $KA/m^2$, with a more preferred range of about 0.05 $KA/m^2$ to about 3 $KA/m^2$.

Current efficiencies during operation of the process of the invention can be increased by employing additional ion exchange compartments, as illustrated by FIG. 2, which are adjacent and operated in a series flow pattern.

Adjusting the width of the ion exchange compartment can also alter the operating cell voltage and current efficiency. The width, or space between the cation exchange membranes forming the walls of the ion exchange compartment, is in the range of from about 0.1 to about 10, and preferably from about 0.3 to about 5 centimeters.

In an alternate embodiment the ion exchange compartment contains a cation exchange medium. Cation exchange mediums which ca be used in the ion exchange compartment include cation exchange resins. Suitable cation exchange resins include those having substrates and backbones of polystyrene based with divinyl benzene, cellulose based, fluorocarbon based, synthetic polymeric types and the like. Where more than one ion exchange compartment is employed, inclusion of the cation exchange medium is optional for each compartment.

Functional cationic groups on these mediums which may be employed include carboxylic acid, sulfonic or sulfuric acids, and acids of phosphorus such as phosphonous, phosphonic or phosphoric. The cation exchange resins are suitably ionically conductive so that a practical amount of current can be passed between the cation exchange membranes used as separators. Various percentage mixtures of resins in the hydrogen form and the sodium form may be used in various sections of the ion exchange compartments on assembly to compensate for the swelling and contraction of resins during cell operation. For example, percentage ratios of hydrogen form to sodium form may include those from 50% to 100%.

The use of cation exchange resins in the ion exchange compartment can serve as an active mediator which can exchange or absorb sodium ions and release hydrogen ions. The hydrogen ions generated at the anode thus regenerate the resin to the hydrogen form, releasing sodium ions to pass into the cathode compartment. Their employment is particularly beneficial when feeding dilute sodium chlorate solutions as they help reduce the cell voltage and increase conversion efficiency.

Preferred as cation exchange mediums are strong acid type cation exchange resins in the hydrogen form as exemplified by low cross-linked resins such as AMBERLITE® IRC-118 (Rohm and Haas Co.) as well as higher cross-linked resins i.e. AMBERLITE® IRC-120. High surface area macro-reticular or microporous type ion exchange resins having sufficient ionic conductivity in the ion exchange compartments are also suitable. Physical forms of the cation exchange resin which can be used are those which can be packed into compartments and include beads, rods, fibers or a cast form with internal flow channels. Bead forms of the resin are preferred.

Cation exchange membranes selected as separators between compartments are those which are inert membranes, and are substantially impervious to the hydrodynamic flow of the alkali metal chlorate solution or the electrolytes and the passage of any gas products produced in the anode or cathode compartments.

Cation exchange membranes are well-known to contain fixed anionic groups that permit intrusion and exchange of cations, and exclude anions from an external source. Generally the resinous membrane or diaphragm has as a matrix, a cross-linked polymer, to which are attached charged radicals such as —SO$_3$— and/or mixtures thereof with —COOH−. The resins which can be used to produce the membranes include, for example, fluorocarbons, vinyl compounds, polyolefins, hydrocarbons, and copolymers thereof. Preferred are cation exchange membranes such as those comprised of fluorocarbon polymers or vinyl compounds such as divinyl benzene having a plurality of pendant sulfonic acid groups or carboxylic acid groups or mixtures of sulfonic acid groups and carboxylic acid groups. The terms "sulfonic acid group" and "carboxylic acid groups" are meant to include salts of sulfonic acid or salts of carboxylic acid groups by processes such as hydrolysis.

Preferred cation exchange membranes are those which exclude chlorate ions efficiently and thus prevent the intrusion of chlorate ions into the anode or cathode compartments. Chlorate ion intrusion may be measured as the ratio of moles of chlorate ion migration to the faradays of current passed. This ratio defines a transference number for chlorate ion. For the most preferred membranes, the chlorate transference number is found to be less than about 0.01.

Suitable cation exchange membranes are readily available, being sold commercially, for example, by Ionics, Inc., by Sybron Corp., by E.I. DuPont de Nemours & Co., Inc., under the trademark "NAFION ®", by the Asahi Chemical Company under the trademark "ACIPLEX ®", and by Tokuyama Soda Co., under the trademark "NEOSEPT ®". Among these are the perfluorinated sulfonic acid type membranes which are resistant to oxidation and high temperatures such as DuPont NAFION ® types 117, 417, 23, etc., membranes from the assignee of U.S. Pat. No. 4,470,888, and other polytetrafluorethylene based membranes with sulfonic acid groupings such as those sold under the RAIPORE ® tradename by RAI Research Corporation.

The catholyte can be any suitable aqueous solution, including alkali metal chlorides, and any appropriate acids such as hydrochloric, sulfuric, phosphoric, nitric, acetic or others.

In a preferred embodiment, deionized or softened water or sodium hydroxide solution is used as the catholyte in the cathode compartment to produce an alkali metal hydroxide. The water selection is dependent on the desired purity of the alkali metal hydroxide by-product. The cathode compartment may also contain a strong acid cation exchange resin in a cation form such as sodium as the electrolyte.

Any suitable cathode which generates hydrogen gas may be used, including those, for example, based on nickel or its alloys, including nickel-chrome based alloys; steel, including stainless steel types 304, 316, 310, etc.; graphite, graphite felt, a multiple layered graphite cloth, a graphite cloth weave, carbon; and titanium or other valve metals as well as valve metals having coatings which can reduce the hydrogen overvoltage of the cathode. The cathode is preferably perforated to allow for suitable release of the hydrogen gas bubbles produced at the cathode particularly where the cathode is placed against the membrane.

Optionally a porous spacer material such as a chemically resistant non-conductive plastic mesh or a conductive material like graphite felt can be positioned behind the anode and/or the cathode to support the electrodes and to permit the adjustment of the gap between the electrode and the cation permeable ion exchange membrane, for example, when using high open area expanded metal electrodes. The porous spacer material preferably has large holes for ease of disengagement of the gases from the anolyte and/or catholyte. A thin protective spacer can also be placed between the anode and/or the cathode and the cation permeable ion exchange membranes. This spacer can be a non-conductive plastic or a porous conductive material like graphite felt. The cell may be operated with the electrode in contact with the thin protective spacer and the porous spacer material, or with the membrane in direct contact with the electrode and with or without the porous spacer material.

It will be recognized that other configurations of the electrolytic cell can be employed in the process of the present invention, including bipolar cells utilizing a solid plate type anode/cathode or bipolar membranes. For example, a bipolar electrode could include a valve metal such as titanium or niobium sheet clad to stainless steel. The valve metal side could be coated with an oxygen evaluation catalyst and would serve as the anode.

An alternative anode/cathode combination which is commercially available is a platinum clad layer on stainless steel or niobium or titanium and is prepared by heat/pressure bonding.

The product solution contains chloric acid and alkali metal chlorate in a wide range of concentrations and ratios of chloric acid to alkali metal chlorate. For example, the solutions produced can provide molar ratios of chloric acid to alkali metal chlorate of from about 0.1:1 to about 250:1. Where the product solutions are to be used for known commerical process for the generation of chlorine dioxide, suitable molar ratios of chloric acid to alkali metal chlorate of from about 0.3:1 to about 200:1, and preferably from about 1:1 to about 100:1.

These solutions are highly acidic and are sustantially free of anionic and cationic impurities. These solutions can be used without requiring additional acids, or where additional acids are wanted or required, permit a reduction in the amount of acid employed in the generation of chlorine dioxide.

Acid addition is not required for chlorine dioxide generation when the chloric acid in the chloric acid/sodium chlorate mixture provides the necessary acidity for the reaction to occur with the addition of a reducing agent.

Illustrative of the reducing agents that can be used are typical inorganic and organic reducing agents. Inorganic reducing agents are selected from the group of acids such as aqueous hydrochloric acid and gases such as carbon monoxide and anhydrous HCl. Other inorganic reducing agents are selected from the group of peroxides such as hydrogen peroxide and alkali metal peroxides such as sodium peroxide and potassium peroxide. Organic reducing agents are selected from the group of alcohols such as methanol, ethanol, propanol, isopropanol, and higher molecular weight linear and branched alcohols. Other suitable organic reducing agents ar selected from the group of carbohydrate sugars such as glucose, sucrose, maltose, and others. An additional group of organic reducing agents are the water soluble carboxylic acids such as formic acid, oxalic acid, lactic acid and their corresponding alkali metal salts such as sodium formate, sodium oxalate, sodium lactate. An additional group of organic type reducing agents are glycols such as ethylene and propylene glycol. Another group of suitable reducing agents are the aldehydes such as formaldehyde.

Unsatisfactory are those reducing agents which form persistent anions include such as sulfur dioxide, and compounds of sulfur, including sodium thiosulfate, sodium polysulfide, sulfur, thionyl chloride, and sulfonyl chloride, and organic sulfonates, sulfates, and mercaptans. These reducing agents form no volatile sulfate ion when they react with chloric acid or chlorate ions and this sulfate ion persists in the generator and also enters the electrolytic cell. The sulfate ion can reduce the rate of chlorine dioxide generation by buffering or kinetically inhibiting the concentration of available hydrogen ions in the chloric acid - alkali metal mixture in the generator aqueous solution for producing chlorine dioxide. The sulfate ion will eventually accumulate in the system such that the alkali metal chlorate precipitate will be largely composed of neutral and then acidic salts depending on the acid normality in the generator solution.

The suitable organic reducing agents such as ethylene glycol, carbohydrate sugars, methanol, other alcohols, oxidize to form carbon dioxide which exits the generator with the chlorine dioxide and so these do not form persistant anions. During the oxidation of methanol, formic acid is produced as an intermediate prior to being fully oxidized to carbon dioxide. Formic acid ma be present as formate ion, but is eventually oxidized and is therefore also not persistent.

The most preferred reducing agents are those that do not produce significant amounts of chlorine in the chlorine dioxide product. One of the most preferred is hydrogen peroxide.

When the chloric acid - sodium chlorate mixture is used to produce chlorine dioxide, without the addition of another acid, i.e., substantially free of anionic and cationic impurities, it is preferred that the chloric acid concentration in the generator solution be about 0.5 normal or greater, and preferably 1.0 normal or greater. Solutions of these concentrations of $HClO_3$ could be produced directly in the electrochemical cell. However, it may be desirable to concentrate the $HClO_3$ in the product solutions after removal from the cell as crystals of the alkali metal chlorate may be formed during the concentration.

The product solutions may be concentrated, for example, by evaporation at sub-atmospheric pressures and temperatures of less than about 100° C. For example, in the range of from about 30° to about 90° C., and preferably, from about 50° to about 80° C. Solutions containing up to about 50% by weight of chloric acid, and more preferably in the range of from about 30% to about 40% by weight of chloric acid, may be produced in this manner.

Freeze concentration may be used to separate sodium chlorate from the chloric acid solution and thus concentrate the remaining chloric acid simultaneously. As the solution of chloric acid and sodium chlorate is chilled, ice and sodium chlorate will crystallize simultaneously and in separate phases. The solution phase will be enriched in chloric acid and reduced in water content until a eutectic point is reached, at which chloric acid hydrate also crystallizes. This eutectic point is believed to occur at a solution concentration of about 30% to 35% chloric acid by weight. During the practice of freeze concentration, it is also possible to recycle the melted ice along with the sodium chlorate which dissolves as the ice melts for the purpose of preparing additional sodium chlorate solution for feed to the electrolytic cell in the process of this invention.

An alternative embodiment includes a combination of freeze concentration followed by vacuum evaporation to further concentrate the chloric acid.

The continuous chlorine dioxide generation process permits the co-production of valuable by-products, for example, an alkali metal hydroxide solution such as sodium hydroxide. Further, the process reduces operating costs by eliminating process steps and equipment from processes from those presently commercially available.

During generator operation, the temperature and pressure are related by the boiling point of the solution. The operating temperature of the generator should be in the range of from about 30° to 120° C., preferably in the range from about 35° to 110° C. and more preferably in the range of 40° to 100° C. at pressures preferably below atmospheric, in the range of about 30 to 500 mm Hg. Generator operation above atmospheric is possible by methods insuring that the gaseous chlorine dioxide in the generator does not exceed explosive concentrations. The rate of heat addition to the generator is maintained to remove water added to the generator at about the same rate it is added in the feed, and this water vapor also serves to dilute the chlorine dioxide to a partial pressure of less than about 70 mm Hg.

The chlorine dioxide generator is preferably operated so as to precipitate alkali metal chlorate at about the same rate as it is added with the feed. The feed from the electrolytic cell to the generator is preferably saturated in alkali metal chlorate, particularly sodium chlorate, and preferably heated to increase solubility to about 45 wt % or greater, more preferably 48 wt % or greater. The ratio of chloric acid to chlorate ion in the electrolytic cell feed to the chlorine dioxide generator is preferred to be 0.5:1 to 1:1 or greater.

Alkali metal chlorate precipitation in the generator depends on the solubility of the alkali metal chlorate salt in chloric acid. The salt solubility is highly dependent both on temperature and the chloric acid concentration.

If the generator is operated without precipitation of alkali metal chlorate, some of the spent generator solution containing both alkali metal chlorate and about 0. normal chloric acid or greater must be recycled so as to minimize waste. Recyling this solution as a feed to the ion exchange compartment of the electrolyzer is possible, but not as desirable, because the hydrogen ion concentration in the generator liquor flowing through the ion exchange compartment liquor will preferentially compete with alkali metal ions and migrate through the membrane to the cathode compartment where they combine with and neutralize hydroxide ions. The net result of this is a decrease in the alkali metal removal current efficiency of the electrolytic cell in the formation of chloric acid.

Another alternative is to recycle this solution as a feed into the anode compartment of the electrolytic cell, and to recycle the stream from the anode compartment back into the generator. This mode of operation is preferred over combining the recycled generator liquor with feed to the first ion exchange compartment, in that the current efficiency of the electrolytic cell is not substantially reduced, but actually increased. However, the anodic oxidation of chlorate and chloric acid on the anode can produce perchloric acid which will subsequently decrease the yield of chlorine dioxide from the chlorate, and consume additional reducing agent. But the recyling of only a portion of the generator liquor stream in this manner minimizes the total amount of reactor losses due to perchlorate ion formed.

In a further alternative embodiment, the combined electrolytic process and the chlorine dioxide generator can be operated continuously without alkali metal chlorate precipitation in the generator by employing a smaller second precipitating vessel that takes a small slipstream flow from the generator recirculating liquor, precipitating an alkali metal salt from the liquor, separating an alkali metal chlorate precipitate from the liquor, recycling the aqueous chloric acid - alkali metal solution back to the generator, and recycling the alkali metal chlorate precipitate to the electrolytic cell alkali metal feed system. The precipitation process could employ the evaporation or freezing methods disclosed in this application. The amount of alkali metal precipitate removed would need to balance with the alkali metal chlorate consumption for chlorine dioxide generation. Some of the advantages with this process is that the chlorine dioxide generator production is increased because there is a generator operating volume increase because there is no precipitate in the liquor taking up volume. The process would take more capital equipment and have a higher operating cost, but this is offset by an increase in chlorine dioxide production capacity.

To further illustrate the invention the following examples are provided without any intention of being limited thereby. All parts and percentages are by weight unless otherwise specified.

EXAMPLE 1

An electrochemical cell of the type shown in FIG. 1 consisting of three compartments machined from ultra high density polyethylene (UHDPE) including an anode compartment, a central ion exchange compartment, and a cathode compartment. The ½ inch (1.27 cm.) thick anode compartment contained a titanium mesh anode having an oxygen-evolving anode coating (PMCA 1500 ® Englehard Corporation, Edison, N.J.). The anode was supported and spaced apart from the UHDPE back wall using multiple layers of polyethylene mesh having ¼ inch square holes and being 1/16 inch in thickness. A polyethylene mesh spacer was positioned between the anode and adjoining membrane to provide an anode-membrane gap of 0.0625 inch (0.1588 centimeters). The anode compartment was filled with a 2.0 percent by weight sulfuric acid solution. The ½ inch (1.27 cm.) thick cathode compartment contained a 304 stainless steel perforated plate cathode mounted flush to the surface of the cathode compartment with the polyethylene mesh spacers. The cathode was positioned in contact with the adjacent membrane providing a zero distance gap. The cathode compartment was initially filled with a sodium hydroxide solution (2% by weight) as the catholyte. Separating the anode compartment from the ion exchange compartment, and the ion exchange compartment from the cathode compartment were a pair of perfluorosulfonic acid cation permeable membranes with a 985 equivalent weight, obtained from the assignee of U.S. Pat. No. 4,470,888. The ion exchange compartment was a machined ¼ inch (0.625 cm) thick frame with inlet and outlet and contained the polyethylene mesh spacers to distribute the chlorate solution as well as to support and separate the two membranes.

An aqueous sodium chlorate solution containing 20 weight percent of $NaClO_3$ was prepared by dissolving reagent grade sodium chlorate in deionized water.

During operation of the electrolytic cell, the chlorate solution was metered into the bottom of the ion exchange compartment in a single pass process at feed rates varying from 7.0 g/min. to 14.4 g/min. Electrolyte circulation in the anode and cathode compartments was by gas lift effect only. The cell was operated employing a cell current of 24.5 amperes at a current density of 1.20 KA/m2. The cell voltage varied according to the cell operating temperature. A sample of the product solution was taken at each flow rate, the temperature measured, and the product solution analyzed for chloric acid and sodium chlorate content. The product solutions were colorless, indicating no chlorine dioxide was formed in the ion exchange compartment. The concentration of the sodium hydroxide catholyte during cell operation increased to 12 percent by weight. The results are given in Table I.

TABLE I

| Cell Volts | Cell Amps | NaClO3 Feed Flowrate (gm/min) | Product Temp (C.) | HClO3 Wt % | NaClO3 Wt % | HClO3:NaClO3 Molar Ratio | Conversion % to HClO3 | C.E. % | Residence Time (min) | KWH/TON of HClO3 |
|---|---|---|---|---|---|---|---|---|---|---|
| 5.00 | 24.5 | 14.40 | 30.0 | 5.96 | 12.49 | 0.60 | 38.00 | 69.50 | 11.38 | 2082 |
| 4.87 | 24.5 | 12.35 | 42.0 | 6.51 | 11.80 | 0.70 | 41.00 | 65.20 | 13.27 | 2152 |
| 4.76 | 24.5 | 10.00 | 45.0 | 7.24 | 10.88 | 0.84 | 45.60 | 58.60 | 16.39 | 2336 |
| 4.50 | 24.5 | 7.17 | 50.0 | 8.34 | 9.49 | 1.11 | 52.60 | 48.50 | 22.86 | 2674 |
| 4.44 | 24.5 | 7.00 | 54.0 | 8.43 | 9.38 | 1.13 | 53.10 | 47.80 | 23.41 | 2673 |

EXAMPLE 2

The electrochemical cell of FIG. 2 was employed having a second ion exchange compartment adjacent to the first ion exchange compartment. The anode compartment containing the same type of anode used in Example 1 was filled with a strong acid hydrogen form cation exchange resin (AMBERLITE ® IRC-120 plus, Rohm & Haas Company) as the electrolyte. A perfluorinated sulfonic acid-based membrane (Dupont NAFION ® 417) separated the anode compartment from the first ion exchange compartment. The two ion exchange compartments were fully filled with AMBERLITE ® IRC-120 plus cation exchange resin in the hydrogen form and were separated by a Dupont NAFION ® 417 membrane. The same membrane was employed to separate the second ion exchange compartment from the cathode compartment. The cathode compartment contained a perforated 304 stainless steel cathode, and was filled with a sodium form AMBERLITE ® IRC-120 plus cation exchange resin. Both the anode compartment and the cathode compartment were filled with deionized water. The sodium chlorate solution fed to the ion exchange compartments was prepared from reagent grade sodium chlorate dissolved in deionized water to form a 16 weight percent solution as sodium chlorate. The sodium chlorate solution at 20° C. was fed to the bottom of ion exchange compartment 20 adjacent to the cathode compartment at a flow rate of 6.5 grams per minute. The chloric acid-sodium chlorate solution flow from the upper part of ion exchange compartment 20 was routed into the bottom of ion exchange compartment 40 adjacent to the anode compartment and collected from the top of ion exchange compartment 40. The total residence time of the solution in the ion exchange compartments was about 42 minutes.

During operation of the cell, the cell current was set at a constant 23.0 amperes for an operating current density of 1.5 KA/m2. The cell voltage stabilized at 9.60 volts, and the product temperature was 65° C.

Circulation in the anode and cathode compartments of the electrolyte was by gas lift effect and the liquid level of the gas disengagers was set at 3 inches (7.62cm) above the height of the cell.

The product solution from the cell contained 11.44 weight percent as $HClO_3$ which represented a 90% conversion of the sodium chlorate to chloric acid. The current efficiency was determined to be 61.6% and the power consumption was 4490 KWH/Ton of $HClO_3$. The product solution was light yellow in color, indicating the presence of some chlorine dioxide or chlorine in the chloric acid - sodium chlorate solution product.

EXAMPLE 3

An electrochemical cell was constructed similar to that of FIG. 1 consisting of three compartments. The anolyte and catholyte compartments were machined from 1 inch (2.54 cm) thick natural polyvinylidene difluoride (PVDF). The outside dimensions of both the anolyte and catholyte compartments were 5 inches (12.7 cm) by 14 inches (35.56 cm) with machined internal dimensions of 3 inches (7.62 cm) by 12 inches (30.48 cm) by 0.250 inch (0.635 cm) deep. Flow entry and exit ports as well as flow distributions holes were drilled from the outside of the frame to the central recess area for flow into and out of the compartments.

The central ion exchanging compartment was machined from 1 inch (2.54 cm) thick natural PVDF with outside dimensions of 5 inch (12.7 cm) by 16 inch (40.64 cm) to a ⅛" (0.317 cm) by 5 inch (12.7 cm) by 14 inch (35.56 cm) thick center area with a central 3 inch (7.62 cm) by 13 inch (33.02 cm) area cutout. The 1 inch (2.54 cm) by 1 inch top and bottom ends were drilled with a single central hole to form entry/exit ports and tapped to accept ¼ inch NPT pipe thread fittings.

A series of 0.055 inch (0.1397 cm) holes were drilled every ½ inch (1.27 cm) from the central cutout area into the flow distribution hole in the 1 inch by 1 inch entry/exit ends of the ion exchanging compartment frame. These flow distribution holes go through the ⅛ inch thickness of the central part of the frame.

The anolyte compartment was fitted with an open diamond pattern nonflattened expanded sheet prepared from 0.060 inch (0.1524 cm) thick titanium with the expanded metal sheet having a total depth of 0.140 inches (0.3556 cm) by 3 inch (7.62 cm) wide by 12 inch (30.48 cm) long dimensions. A ½ inch (1.27 cm) wide by 12 inch (30.48 cm) long by 1/16 inch (0.0625 cm) thick titanium current distributor strip was welded at multiple points to the backside of the expanded titanium sheet.

Two ½ inch (1.27 cm) diameter titanium current conductor posts were then welded to the back side of the flat titanium current distribution strip. The expanded titanium surfaces were then plated with a layer of metallic platinum approximately 2 micron (78 microinch) thick by a brush electroplating method using a diluted chloroplatinic acid solution. The anode structure was then mounted into the recess inside the anolyte compartment using one or more layers of 1/16 inch (0.1588 cm) thick expanded polytetrafluorethylene mesh behind the anode to make the anode surface flush with the inside surface of the anolyte compartment.

The catholyte compartment was fitted with a 1/16 inch (0.1588 cm) thick by 3 inch (7.62 cm) by 12 inch (30.48 cm) type 316L stainless steel perforated plate having two ½ inch (1.27 cm) diameter 316L stainless conductor posts welded on the back side. The cathode plate was mounted in the recess inside the catholyte compartment using two layers of 1/16 inch (0.1588 cm) thick expanded polytetrafluorethylene mesh behind the cathode plate to make the cathode surface flush with the inside surface of the catholyte compartment.

The electrochemical cell assembly was completed using 0.040 inch (0.1016 cm) thickness polytetrafluorethylene compressible GORE-TEX ® gasket tape (W. L. Gore & Associates, Elkton, Md.) on the sealing surfaces of all the compartment cell frames. Two layers of a lose woven polytetrafluoroethylene filament with a 1/16 inch (0.1588 cm) thickness are laid in place in the central ion exchange compartment to provide for flow distribution and physical formation of the flow channel. DuPont NAFION ® 324 perfluorinated sulfonic acid cation permeable type membranes are then mounted between the central ion exchange compartment and the anolyte and catholyte compartments.

The above cell was operated with a reagent grade 47.15 wt % sodium chlorate solution fed at a flowrate of 11.17 gm/min into the bottom of the central ion exchange compartment. Deionized water was metered into the bottom of the catholyte compartment at a flowrate of 10.40 gm/min. The anolyte was a 30 wt % sulfuric acid which was recirculated at a flowrate of about 50 gm/min with a pump. The applied cell current was 70 amperes for a current density of 3 KA/m2 and the cell voltage was 5.55 volts. A slightly yellow product solution exited the central ion exchanging compartment at a temperature of about 80° C. and, upon analysis, had a composition of about 18.17 wt % $HClO_3$, 26.47 wt % $NaClO_3$, (total as $ClO_3^-$, 38.71 wt %) and $HClO_4$ content <0.03 wt %. The catholyte product contained 7.33 wt % NaOH at an output flowrate of about 12.14 gm/min. The calculated cell operating current efficiency based on the NaOH produced was 51.1%, and 51.7% based on the $HClO_3$ present in the product.

Chloric acid/sodium chlorate solution products from the above cell during several runs provided a composite solution containing about 20.0 wt % $HClO_3$ and about 22 wt % $NaClO_3$, [equivalent to a total chlorate ion ($ClO_3^-$) content of about 37.0 wt %]. The total chlorate ($ClO_3^-$) content was determined by a standard iodiometric method using concentrated HCl and titration with thiosulfate.

The perchloric acid ($HClO_4$) concentration was determined by ion chromatography using dissolved sodium perchlorate solutions as standards. The sodium chlorate content of the samples were calculated by difference.

About 500 ml of the above clear, water color solution was placed in a 1 liter vacuum filter flask fitted with a thermometer, polyfluoroethylene coated magnetic stirring bar, and a 28 mm Hg vacuum water aspirator source. The flask was then placed on a hot plate/magnetic stirrer and heated while the vacuum was applied. The solution was vacuum evaporated in a temperature range between 50°-80° C. Approximately 50 to 100 ml samples of the solution were periodically removed during the vacuum evaporation process. The first three samples showed no precipitates in the hot solution on sampling. The fourth and final sample was obtained when a significant amount of sodium chlorate crystals had accumulated in the vacuum flask at 60° C. and there was a slight yellow color in the solution phase.

All of the samples were then cooled in stoppered flasks in a cold water bath to 20° C. for a period of 1.5 hours to allow the solution to come to equilibrium with the precipitated $NaClO_3$ salt phase. Samples of the water colored supernatants were then removed for analysis. The chloric acid ($HClO_3$) content was determined by titration with NaOH.

The results are listed in Table II.

TABLE II

| EXAMPLE NUMBER | $HClO_3$ WT. % | $ClO_3^-$ WT. % | $NaClO_3$ WT. % | $HClO_4$ WT. % | $ClO_3^-/H_2O$ WEIGHT RATIO | $ClO_3^-/H_2O$ MOLAR RATIO |
|---|---|---|---|---|---|---|
| 1 | 21.33 | 37.82 | 21.36 | <0.03 | 0.660 | 0.142 |
| 2 | 25.26 | 38.42 | 17.17 | <0.03 | 0.667 | 0.144 |
| 3 | 29.75 | 40.04 | 13.57 | <0.03 | 0.706 | 0.152 |
| 4 | 35.85 | 42.73 | 9.32 | <0.03 | 0.779 | 0.168 |

NOTE:
ION CHROMATOGRAPHY DETECTION LIMIT FOR $HClO_4$ WAS 0.03 WT. %.

EXAMPLE 4

A 0.75 square meter active area electrolytic cell similar to FIG. 1 with an anode compartment containing an Eltech TIR-2000 oxygen evolving anode, a cathode compartment containing a 316 stainless steel expanded metal cathode, and a single ion exchange compartment fabricated from polyvinylidene difluoride (PVDV)plastic with an inlet and outlet means having a 0.3175 cm thickness in the center active area of the compartment and having a DuPont NAFION ® 417 perfluorinated cation ion exchange membrane adjacent to the anode compartment and an Asahi Glass Ex-126 gas release coated membrane adjacent to the cathode compartment, is constructed.

A 48 wt % sodium chlorate feed is prepared from commercial chlorate crystal and deionized water and fed into the bottom of the ion exchange compartment at a mass flowrate of 220 gm/min. The cell amperage is 2100 amperes at a currenmt desnity of 3.0 KA/m2. The cell voltage is 4.8 volts. The chloric acid - sodium chlorate product from the ion exchange compartment output of the electrolytic cell has a composition of about 18 wt % of chloric acid and about 22 wt % sodium chlorate, with a total chlorate ion content of about 38 wt %, and a perchloric acid content of less than 0.03 wt %, below the detection limit of the ion chromatography analysis method and sample size. The normality of chloric acid in the 18 wt % chloric acid - sodium chlorate product solution mixture is determined to be about 2.75 normal by measuring the solution specific gravity.

The electrolyzer chloric acid solution product is fed into an isolating surge tank on level control and pumped into a chlorine dioxide generator at a rate of about 200 gm per minute. The generator vessel is a 400 liter glass lined reactor having a conical bottom and drain that is initially filled with about 180 liters of the electrolyzer product. The solution is heated by pumping it through a heat exchanger with titanium tubes and a having a total heat exchange area of about 1.1 square meters. Steam is added to the heat exchanger through a control valve until a temperature of about 75° C. is obtained. The generator is connnected at the top to a condenser, maintained at a temperature of about 40° C., and the vent is connected to the gas inlet at the bottom of a packed column 3 meters high and 0.1 meters in diameter, packed with 1 cm ceramic saddles. the column is connected at the top to a steam jet ejector. The ejector is operated to evacuate the system to obtain a total absolute pressure of about 200 mm Hg, at which condition, water is evaporated from the generator.

Hydrogen peroxide is added to the generator at a rate of about 7.3 grams per minute to generate chlorine dioxide at a rate of about 28.8 grams per minute, and oxygen at a rate of about 3.4 grams per minute, and water vapor at about 131 grams per minute. Chilled water is added to the condenser and the chiller at a rate of about 2.7 liters per minute, and the combined stream of condensate and absorber bottoms product is analyzed by adding neutral KI to a sample followed by titration with sodium thiosulfate titrant to a starch endpoint, and after adding excess HCl to the sample, an additional thiosulfate titration is performed. The titrations show that the product contains approximately 10 grams per liter of chlorine dioxide and containing less than about 0.2 gm per liter chlorine (the limit of detection).

In the generator, sodium chlorate begins to crystallize and a stream is withdrawn from the generator having a crystal content of about 20% to 30% settled solids by volume. The slurry is filtered by means of a screen bowl centrifuge and washed with approximately 10 grams of water per each 100 grams of sodium chlorate collected. A combined filtrate and wash having a chlorate content of about 22 wt % and a chloric acid content of about 16 wt % by weight is obtained. This stream is recycled to the generator. The filtered chlorate crystals are removed from the centrifuge by an additional washing step using hot deionized water to obtain a solution that is analyzed and found to contain about 0.1 wt % chloric acid and 48 wt % sodium chlorate. The solution is fed to the electrolytic cell, substituting for the 48 wt % solution of sodium chlorate at an equal rate.

The product from the electrolytic cell is shown to have an unchanged content of chloric acid and the sodium hydroxide product based current efficiency of the cell is measured to be about 50%.

Illustrative of an electrolytic cell of the present invention containing more than one ion exchange compartment between the anode compartment and the cathode compartment is the electrolytic cell shown in FIG. 2 herein which discloses two ion exchange compartments positioned between the anode and cathode compartments and adjacent to each other. When there is more than one ion exchange compartment, for example 2, 3, 4 or more, the ion exchange compartments are always positioned adjacent to each other with the entire ion exchange compartment assembly positioned between the anode and the cathode compartments. The electrolytic cell may consist of a stack of a number of subunits containing anode and cathode compartments with intervening ion exchange compartments that are assembled in suitably designed monopolar or bipolar arrangements that are well known in the art.

The ion exchange compartment positioned adjacent to the cathode compartment is designated the first ion exchange compartment. The cation flow of alkali metal ions and hydrogen ions in the cell travels from the anode compartment through the intervening ion exchange compartments to the first ion exchange compartment adjacent the cathode compartment. The flow of the aqueous solution of chloric acid - alkali metal chlorate preferably goes from the first ion exchange compartment, which is adjacent to the cathode compartment, sequentially through any additional ion exchange compartment(s) positioned between the first ion exchange compartment and the anode compartment. The aqueous chloric acid - alkali metal chlorate product solution is preferably removed from the ion exchange compartment adjacent to the anode and transferred to the chlorine dioxide generator. (See FIG. 3). The alkali metal chlorate feed stream is preferably fed into the ion exchange compartment next to the cathode compartment, i.e., the first ion exchange compartment. This feed stream contains dissolved precipitated alkali metal chlorate being recycled from the chlorine dioxide generator and make-up alkali metal chlorate to replace that consumed in the process of the invention.

The scope of the appended claims is intended to encompass all obvious changes in the details, materials, and arrangements of parts, which will occur to one of skill in the art upon a reading of the disclosure. All patent applications and patents disclosed to and referred to in this application are incorporated herein in their entirety by reference.

What is claimed is:

1. A process for producing chlorine dioxide which comprises:
   a) feeding an aqueous solution of an alkali metal chlorate to a first ion exchange compartment of an electrolytic cell having an anode compartment, a cathode compartment and one or more ion exchange compartment between the anode compartments and the cathode compartment, with the proviso that where more than one ion exchange compartment is present, said first ion exchange compartment is located adjacent to the cathode compartment,
   b) electrolyzing an anolyte in the anode compartment to generate hydrogen ions,
   c) passing the hydrogen ions from the anode compartment through a cation exchange membrane into said first ion exchange compartment to displace alkali metal ions and produce an aqueous solution of chloric acid and alkali metal chlorate substantially free of anionic and cationic impurities,
   d) passing alkali metal ions from the first ion exchange compartment into the cathode compartment, and
   e) reacting the aqueous solution of chloric acid and alkali metal chlorate substantially free of anionic and cationic impurities in a generator with a reducing agent which does not form persistent anions to generate chlorine dioxide and precipitate alkali metal chlorate.

2. The process of claim 1 wherein said reducing agent which does not form persistent anions in the aqueous generator solution is selected from the group consisting of an aqueous or anhydrous hydrochloric acid, carbon monoxide, hydrogen peroxide, an alkali metal peroxide, a water soluble linear or branched chain alcohol, a water soluble carbohydrate sugar, an aldehyde, a water soluble carboxylic acid or alkali metal caboxylic acid salt an mixtures thereof.

3. The process in claim 2 wherein said reducing agent which does not form persistent anions in the aqueous generator solution is hydrogen peroxide.

4. The process of claim 1 wherein said alkali metal chlorate is sodium chlorate or potassium chlorate.

5. A process as claimed in claim 1 in which the precipitated alkali metal chlorate is:
   a) separated from the generator reaction mixture liquor, and
   b) dissolved in the alkali metal chlorate feed stream and recycled to said first ion exchange compartment of said electrolytic cell.

6. The process of claim 5 wherein said reducing agent which does not form persistent anions in the aqueous generator solution is selected from the group consisting of an aqueous or anhydrous hydrochloric acid, carbon monoxide, hydrogen peroxide, an alkali metal peroxide, a water soluble linear or branched chain alcohol, a water soluble carbohydrate sugar, an aldehyde, a water soluble carboxylic acid or alkali metal carboxylic acid salt and mixtures thereof.

7. The process of claim 6 in which the linear or branched chain alcohol is selected from the group consisting of methanol, ethanol, propanol, isopropanol and mixtures thereof.

8. The process of claim 6 in which the water soluble carbohydrate sugar is selected from the group consisting of glucose, sucrose, maltose and mixtures thereof.

9. The process of claim 6 in which the aldehyde is formaldehyde.

10. The process of claim 6 in which the water soluble carboxylic acid is selected from the group consisting of formic, oxalic, lactic acid or their corresponding alkali metal salts and mixtures thereof.

11. The process of claim 6 wherein said reducing agent which does not form persistent anions in the aqueous generator solution is hydrogen peroxide.

12. The process of claim 5 in wherein said alkali metal chlorate is sodium chlorate or potassium chlorate.

13. A continuous process for producing chlorine dioxide by reacting in a generator an aqueous solution of chloric acid and an alkali metal chlorate being substantially free of anionic and cationic impurities with a reducing agent which does not form persistent anions to generate chlorine dioxide and precipitate alkali metal chlorate.

14. The continuous process of claim 13 in which the alkali metal chlorate is sodium chlorate or potassium chlorate.

15. The continuous process of claim 13 in which the reducing agent which does not form persistent anions is hydrogen peroxide.

16. A continuous process for producing chlorine dioxide which comprises:
   a) feeding an aqueous solution of an alkali metal chlorate to an ion exchange compartment of an electrolytic cell having an anode compartment, a cathode compartment and an ion exchange compartment between the anode compartment and the cathode compartment,
   b) electrolyzing an anolyte in the anode compartment to generate hydrogen ions,
   c) passing the hydrogen ions from the anode compartment through a cation exchange membrane into said ion exchange compartment to displace alkali metal ions and produce an aqueous solution of chloric acid and alkali metal chlorate substantially free of anionic and cationic impurities, d) passing alkali metal ions from said ion exchange compartment into the cathode compartment, e) removing the aqueous solution of chloric acid and alkali metal chlorate substantially free of anionic and cationic impurities from said ion exchange compartment, f) reacting the aqueous solution of chloric acid and alkali metal chlorate substantially free of anionic an cationic impurities in a generator with a reducing agent which does not form persistent anions to generate chlorine dioxide and precipitate alkali metal chlorate, g) withdrawing chlorine dioxide, water vapor and other gaseous reducing agent by-products from the generator, h) separating from the generator reaction liquor the precipitated alkali metal chlorate and recycling the generator reaction liquor to the generator, i) washing the separated alkali metal chlorate precipitate with water or an alkali metal solution to reduce residual chloric acid in the precipitate, and j) recycling the washed alkali metal chlorate precipitate by dissolving the precipitate into an alkali metal chlorate feed stream that is fed to said ion exchange compartment of said electrolytic cell.

17. The process of claim 16 wherein said reducing agent which does not form persistent anions in the aqueous generator solution is selected from the group consisting of an aqueous or anhydrous hydrochloric acid, carbon monoxide, hydrogen peroxide, an alkali metal peroxide, a water soluble linear or branched chain alcohol, a water soluble carbohydrate sugar, an aldehyde, a water soluble carboxylic acid or alkali metal caboxylic acid salt and mixtures thereof.

18. The process in claim 17 wherein said reducing agent which does not form persistent anions in the aqueous generator solution is hydrogen peroxide 19. The process of claim 16 wherein said alkali metal chlorate is sodium chlorate or potassium chlorate.

20. The process of claim 16 wherein the chloric acid concentration in the aqueous solution of chloric acid and alkali metal chlorate in said chlorine dioxide generator is 0.5 normal or greater.

21. A continuous process for producing chlorine dioxide which comprises the steps of:

a) feeding an aqueous solution of an alkali metal chlorate to a first ion exchange compartment of an electrolytic cell having an anode compartment, a cathode compartment and two adjacent ion exchange compartments between the anode compartment and the cathode compartment, with said first ion exchange compartment being adjacent the cathode compartment and said second ion exchange compartment being positioned between the anode compartment and said first ion exchange compartment, b) electrolyzing an anolyte in the anode compartment to generate hydrogen ions, c) passing hydrogen ions from the anode compartment through a cation exchange membrane into said second ion exchange compartment to displace alkali metal ions, then passing a mixture of alkali metal ions and hydrogen ions from the second ion exchange compartment into the first ion exchange compartment to displace additional alkali metal ions and produce an aqueous solution of chloric acid and alkali metal chlorate substantially free of anionic and cationic impurities, d) passing alkali metal ions from the first ion exchange compartment into the cathode compartment, e) feeding, in a series flow, the aqueous solution of chloric acid and alkali metal chlorate substantially free of anionic and cationic impurities from said first ion exchange compartment to said second ion exchange compartment, f) removing the aqueous solution of chloric acid and alkali metal chlorate substantially free of anionic and cationic impurities from said second ion exchange compartment and transferring said solution into a chlorine dioxide generator, g) reacting the aqueous solution of chloric acid and alkali metal chlorate substantially free of anionic and cationic impurities in said generator with a reducing agent which does not form persistent anions to generate chlorine dioxide and precipitate alkali metal chlorate, h) withdrawing chlorine dioxide, water vapor and other gaseous reducing agent by-products from said generator, i) separating from the generator reaction liquor the precipitated alkali metal chlorate and recycling the generator reaction liquor to said generator, j) washing the separated alkali metal chlorate precipitate with water or an alkali metal chlorate solution to reduce residual chloric acid in the precipitate, and k) recycling the washed alkali metal chlorate precipitate by dissolving the precipitate into an alkali metal chlorate feed stream that is fed said first ion exchange compartment of said electrolytic cell.

22. The process of claim 21 wherein said reducing agent which does not form persistent anions in the aqueous generator solution is selected from the group consisting of an aqueous or anhydrous hydrochloric acid, carbon monoxide, hydrogen peroxide, an alkali metal peroxide, a water soluble linear or branched chain alcohol, a water soluble carbohydrate sugar, an aldehyde, a water soluble carboxylic acid or alkali metal caboxylic acid salt and mixtures thereof.

23. The process of claim 22 in wherein said reducing agent which does not form persistent anions is hydrogen peroxide.

24. The process of claim 21 wherein said alkali metal chlorate is sodium chlorate or potassium chlorate.

25. The process of claim 21 wherein the chloric acid concentration in the aqueous solution of chloric acid and alkali metal chlorate in the chlorine dioxide generator is 0.5 normal or greater.

26. The process of claim 21 in which the aqueous solution of chloric acid and alkali metal chlorate from said first ion exchange compartment is fed to the lower part of said second ion exchange compartment.

27. The process of claim 21 in which the aqueous solution of chloric acid and alkali metal chlorate from said first ion exchange compartment is fed to the upper part of said second ion exchange compartment.

* * * * *